United States Patent
Ogino et al.

(10) Patent No.: US 6,487,363 B1
(45) Date of Patent: Nov. 26, 2002

(54) VIDEO DUPLICATION CONTROL SIGNAL, VIDEO PLAYBACK DEVICE, VIDEO RECORDING DEVICE, INFORMATION SUPERIMPOSING AND EXTRACTING DEVICE AND VIDEO RECORDING MEDIUM

(75) Inventors: Akira Ogino, Chiba (JP); Takehiro Sugita, Kanagawa (JP); Takashi Usui, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/696,845

(22) Filed: Oct. 26, 2000

Related U.S. Application Data

(62) Division of application No. 09/535,029, filed on Mar. 24, 2000, which is a division of application No. 08/951,024, filed on Oct. 15, 1997, now Pat. No. 6,058,243.

(30) Foreign Application Priority Data

Oct. 22, 1996 (JP) .............................................. 8-298180

(51) Int. Cl.[7] ................................................ H04N 5/91
(52) U.S. Cl. ........................................ 386/94; 380/203
(58) Field of Search ....................... 386/94, 96; 360/60; 380/201, 203, 210; H04N 5/91

(56) References Cited

U.S. PATENT DOCUMENTS

| | | | | |
|---|---|---|---|---|
| 4,352,129 A | * | 9/1982 | Baldwin | 386/124 |
| 5,231,646 A | * | 7/1993 | Heath et al. | 375/130 |
| 5,719,937 A | * | 2/1998 | Warren et al. | 386/94 |
| 5,982,977 A | * | 11/1999 | Naruse et al. | 386/94 |
| 6,058,243 A | * | 5/2000 | Ogino et al. | 386/94 |
| 6,112,008 A | * | 8/2000 | Sugita et al. | 386/94 |
| 6,195,129 B1 | * | 2/2001 | Ogino et al. | 386/94 |

* cited by examiner

*Primary Examiner*—Vincent Boccio
(74) *Attorney, Agent, or Firm*—Jay H. Maioli

(57) ABSTRACT

A playback device 10 generates a pseudo random noise (PN) code with a start timing based on a video sync signal, and generates a PN inverse code which has a reverse polarity to that of the PN code with a timing based on the video sync signal. An anti-duplication control signal is spectrally spread using this PN code, superimposed on the video signal and supplied to a recording device. A PN inverse code which is the same as the PN inverse code used in the playback device is also generated in the recording device based on the video sync signal, and reverse spectral spread is performed using this PN inverse code.

7 Claims, 9 Drawing Sheets

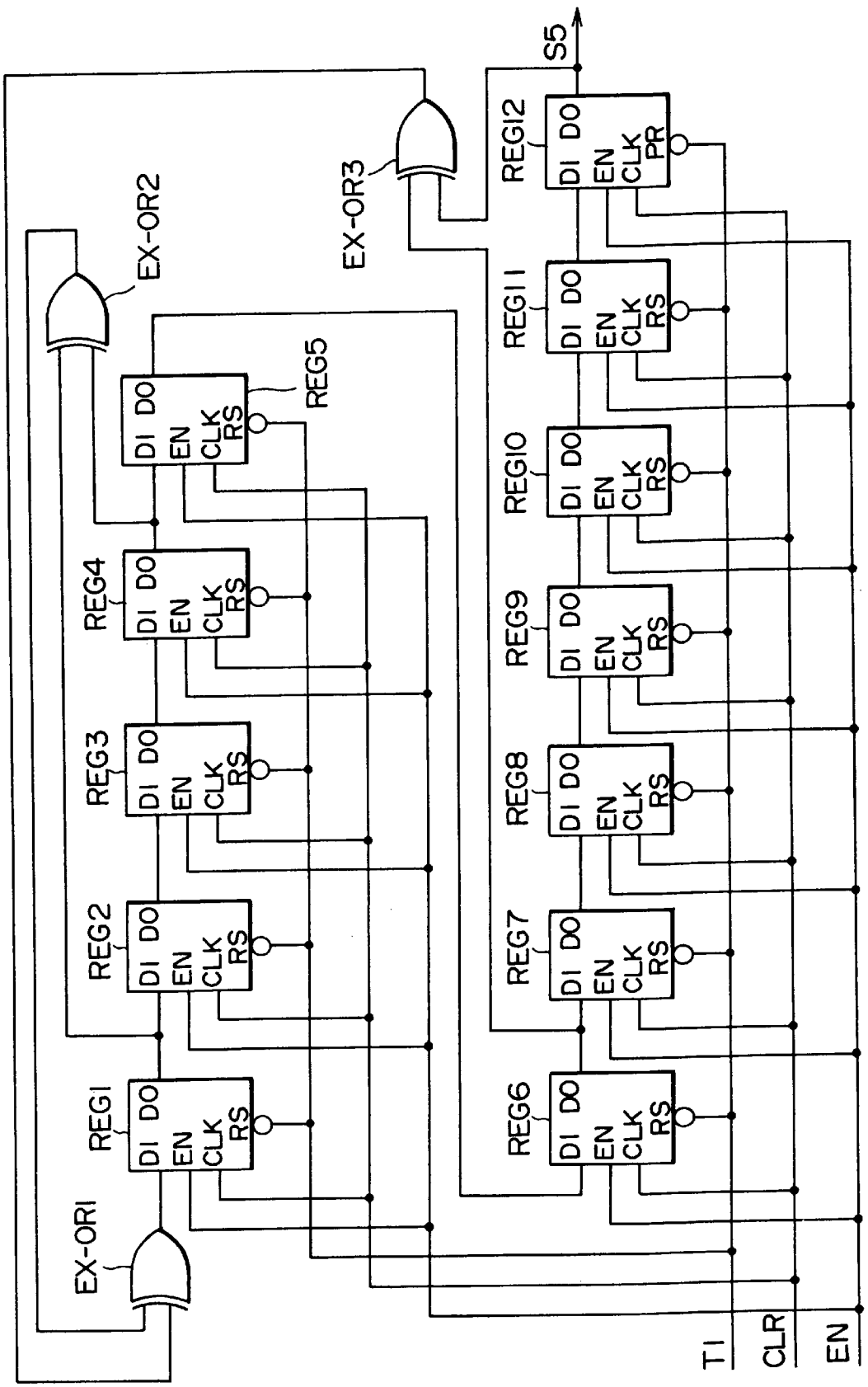
F I G. 5

VIDEO DUPLICATION CONTROL SIGNAL, VIDEO PLAYBACK DEVICE, VIDEO RECORDING DEVICE, INFORMATION SUPERIMPOSING AND EXTRACTING DEVICE AND VIDEO RECORDING MEDIUM

This is a division of prior application Ser. No. 09/535,029 filed Mar. 24, 2000, which is a division of prior application Ser. No. 08/951,024 filed Oct. 15, 1997 now U.S. Pat. No. 6,058,243.

BACKGROUND OF THE INVENTION

This invention relates to a video duplication control system for playing back a video signal recorded on a recording medium, and limiting or preventing the reproduced video signal from being played back and recorded on another recording medium. It also relates to a video playback device, video recording device and video recording medium on which a video signal is recorded which use this video duplication control system.

VTR (Video Tape recording devices) are a commonplace feature of modern-day life, and many kinds of software exist which can be played back on a VTR. Digital VTR or DVD (Digital Video Disks) playback devices are now a reality, and provide videos and sound of exceptionally high quality.

There is, however, a problem in that this great abundance of software can be copied without restriction, and several methods have already been proposed to prohibit this.

For example, for a VTR which outputs an analog video signal, one method to prevent copying uses a difference in the AGC (Automatic Gain Control) system, or in the APC (Automatic Phase Control) system, of the VTR recording device and of a monitor receiver which displays the video.

When the VTR employs AGC using a pseudo sync signal inserted in the video signal, a monitor receiver employs AGC which does not use this pseudo sync signal. In this anti-duplication method using a difference in the type of AGC, a very high level pseudo sync signal is inserted and output in the video signal supplied from the playback VTR to the recording VTR as an AGC sync signal.

When the VTR employs APC using the phase of a color burst in the video signal, the monitor receiver uses a different type of APC. In an anti-duplication method using a difference in the type of APC, the phase of the color burst in the video signal supplied from the playback VTR to the recording VTR is partially reversed.

The monitor receiver which receives the analog video signal from the playback VTR plays back the video correctly without being affected by the high level pseudo sync signal in AGC or the partial phase reversal of the color burst signal in APC.

On the other hand, when a VTR records, on a recording medium, the analog video signal into which pseudo sync signals have been inserted or the analog video signal which has been subjected to color burst signal phase reversing control in the playback VTR as described hereabove, proper gain control or phase control based on the input signal cannot be performed, and so the video signal is not correctly recorded. Even if this signal is played back, therefore, normal picture and sound cannot be obtained.

In the case of a digitized video signal, e.g. in a digital VTR, an anti-duplication signal or an anti-duplication control signal comprising for example a duplication ranking control code, is added as digital data to the video signal and recorded on the recording medium, so as to prevent or control duplication of the video.

In this case, the playback digital VTR reads the video signal, audio signal and anti-duplication control signal, and supplies them as digital or analog data to a recording digital VTR.

In the digital VTR being used as a recording device, the anti-duplication control signal is extracted from the supplied playback signal, and recording of the playback signal is then controlled based on the anti-duplication control signal. For example, when the anti-duplication control signal comprises an anti-duplication signal, the recording VTR does not perform recording.

Alternatively, when the anti-duplication control signal comprises a copy ranking control code, recording is controlled by this ranking control code. For example, when the copy ranking code limits duplication to one copy, the digital VTR used for recording adds this anti-duplication code before recording the video signal and audio signal on the recording medium as digital data. It is thereafter impossible to duplicate the video signal from the copy.

Hence, in the case of a digital connection when the video signal, the audio signal, and the anti-duplication control signal used as digital signals are supplied to the digital VTR used as a recording device, anti-duplication control is performed on the recording side using the anti-duplication control signal by supplying this signal to the digital VTR as digital data.

However, in the case of an analog connection where the video signal and audio signal are supplied as analog signals, the anti-duplication control signal is lost when the signal supplied to the recording device is D/A converted. Hence, in the case of an analog connection, an anti-duplication control signal must be added to the D/A converted video or sound signal, and this causes deterioration of the video signal and audio signal.

It is, therefore, difficult to add an anti-duplication control signal and to extract it in the recorder for the purpose of anti-duplication control, without causing deterioration of the D/A converted video signal or audio signal.

Conventionally, therefore, in the case of an analog connection, duplication was prevented by an anti-duplication method using a difference in the AGC, or a difference in APC characteristics, between the VTR and the monitor receiver as described hereabove.

SUMMARY OF THE INVENTION

However, in some cases, when anti-duplication is prevented using the aforesaid difference in the AGC or a difference in APC characteristics between the VTR and the monitor receiver, depending on the type of AGC or APC characteristics on the recording side, the video signal may nevertheless be correctly recorded. In this case, it might happen that duplication cannot be prevented, or that the reproduced video on the monitor receiver is distorted. Further, it was troublesome to change over the anti-duplication method depending on whether there was an analog connection or a digital connection.

The inventors have already proposed an anti-duplication prevention method in which a spectrally spread anti-duplication control signal is superimposed on a video signal (U.S. patent application Ser. No. 08175510). This method may be used for both digital connections and analog connections, and it causes no deterioration of the video or sound which is played back.

According to this method, when the original recording medium is fabricated, a PN (Pseudorandom Noise) sequence code (referred to hereafter as PN code) used as a spread code is generated with a sufficiently fast period and spectrally spread is applied to the anti-duplication control signal. In this way, a narrow bandwidth, high level anti-duplication control signal is converted to a wideband, low level signal which does not affect the video signal or sound signal. This spectrally spread anti-duplication control signal is then superimposed on the video signal supplied to the recording medium, and recorded.

On the recording side, a PN code is generated with the same timing and phase as the PN code used for the spectral spread in the playback device relative to the video signal and is supplied to the playback device. The generated PN code is applied to the video signal on which the anti-duplication control signal is superimposed so as to extract the original anti-duplication control signal, i.e. so as to perform reverse spectral spread. Anti-duplication is then controlled based on the anti-duplication control signal extracted by this reverse spectral spread operation.

In this way, the anti-duplication control signal is spectrally spread and superimposed on the video signal as a wideband, low level signal in the playback device. It is therefore difficult for a person wishing to illegally duplicate the video signal, to remove the anti-duplication control signal which is superimposed on it.

However, it is possible for a person aiming to prevent illegal duplication to detect the superimposed anti-duplication control signal by reverse spectral spread, and use it. This anti-duplication control signal is therefore supplied to the recording device together with the video signal. On the recording side, the anti-duplication control signal is detected, and duplication is precisely controlled according to the detected anti-duplication control signal.

According to this method, as described hereabove, the spectrally spread anti-duplication control signal is superimposed as a wideband, low level signal on the video signal, but it must be superimposed at a lower S/N ratio than that of the video signal in order for the video control signal not to cause deterioration of the video signal.

To superimpose the spectrally spread anti-duplication control signal at a lower S/N ratio than that of the video signal, and to be able to detect the anti-duplication control signal superimposed on the video signal in the recording device, the number of the PN code (PN code length) required to spectrally spread a 1 bit anti-duplication control signal must be sufficiently large. The PN code length per bit of the anti-duplication control signal may also be expressed as a spread gain (spread factor) which is the ratio (T/TC) of a time width T per bit of the anti-duplication control signal and a time width TC of one part (one chip) of the PN code. As described hereinafter, this spread gain is found from the S/N ratio of the information signal on which the anti-duplication control signal is superimposed, in this case the S/N ratio of the video signal.

For example, when the S/N ratio of the video signal on which the anti-duplication control signal is superimposed is 50 dB, the anti-duplication control signal which is spectrally spread and superimposed on the video signal must be superimposed at a lower level than 50 dB, which is the S/N ratio of the video signal. Also, in order to detect the anti-duplication control signal superimposed on the video signal, its S/N ratio must be sufficient for the spectrally spread signal to be fully demodulated. If this S/N ratio is 10 dB, a spread gain of 60 dB (S/N ratio of 50 dB for video signal)+(S/N ratio of 10 dB necessary for detection) is required. In this case, the PN code length per bit of the anti-duplication control signal is 1 million.

The method used in the recording device to detect the PN code superimposed on the video signal uses a multifilter or a sliding correlation. In the former case, detection of the PN code is rapid, but only a short code length can be detected. At present, this code length. is of the order of 256, and when the PN code length is 1 million per bit of the anti-duplication control signal, it cannot be detected. In the latter case, PN codes of long length can be detected but the detection takes time. It can thus be appreciated that a considerable time is required to detect a PN code having a length of 1 million.

Moreover, if the superposition level of the spectrally spread anti-duplication control signal is too high, the anti-duplication control signal causes serious visual interference with the video signal.

This invention, in view of the above, aims to permit additional information to be superimposed on a video signal so as to control duplication of the signal without causing its deterioration, and to control such duplication by precisely and rapidly extracting this additional information.

A video duplication control system according to this invention comprises a playback device for playing back a video signal, and a recording device for receiving the video signal output by the playback device and recording it on a recording medium, wherein:

the playback device comprises:
   sync signal separating means on the playback side for separating a sync signal from the video signal,
   spread code generating means on the playback side for generating a spread code with a start timing based on the sync signal separated by the sync signal separating means on the playback side,
   spread code inverting means on the playback side for reversing the phase of the spread code from the spread code generating means on the playback side with a timing based on the sync signal separated by the separating means on the playback side,
   spectrum spreading means for spectrally spreading duplication control information superimposed on the video signal according to the spread code processed by the spread code inverting means on the playback side, and
   superimposing means for superimposing the duplication control information which has been spectrally spread by the spectrum spreading means on the video signal, the recording means comprises:
   sync signal separating means on the recording side for separating the sync signal from the video signal supplied by the playback means,
   spread code generating means on the recording side for generating a spread code with a start timing based on the sync signal separated by the sync signal separating means on the recording side,
   spread code inverting means on the recording side for reversing the phase of the spread code from the spread code generating means on the recording side with a timing based on the sync signal separated by the separating means on the recording side,
   reverse spectrum spreading means for performing reverse spectral spread according to the spread code processed by the spread code inverting means on the recording side, and extracting the duplication control information superimposed on the video signal supplied by the playback device, and
   duplication control means for controlling recording of the video signal on the recording medium based on the duplication control information extracted by the spectrum spreading means.

A video recording medium according to this invention is characterized in that a video signal on which additional information, which has been spectrally spread by a reverse spread code obtained by reversing, with a timing based on a sync signal in the video signal, the phase of a spread code which starts to be generated with a timing based on the sync signal in the video signal and superimposed on the video signal, is recorded on it.

In the duplication control system according to this invention, a spread code starts to be generated with a timing based on the sync signal separated from the video signal in the playback device, and the spread code is phase inverted with a timing based on this sync signal. In this context, phase inversion of the spread code refers to bit inversion where 0's are replaced by 1's and 1's are replaced by 0's. The additional information is spectrally spread using this inverted spread code and superimposed on the video signal.

In the recording device, a spread code starts to be generated with a timing which is identical to the generation timing in the playback device relative to the video sync signal and based on the video sync signal separated from the video signal supplied by the playback device. Also, the polarity of the spread code generated in the recording device is reversed with a timing based on the video sync signal. In the recording device, this inverse spread code is used to perform reverse spectral spread.

During reverse spectral spread, the generation timing of the spread code used to perform reverse spectral spread must be controlled for the video signal from the playback device so that it is identical to that of the spread code used to perform spectral spread in the playback device.

This generation timing is determined based on the video sync signal separated from the video signal. The generation timing of the spread code generated in the recording device can therefore be adjusted to be the same as the generation timing of the spread code used in the playback device for the video sync signal.

The spread code used to perform spectral spread in the playback device and the spread code used to perform reverse spectral spread in the recording device are phase inverted with a timing based on the video sync signal. For example, by inverting the polarity of the spread code every other field (one vertical interval), a spread code of different polarity in every field is generated.

In the recording device, similarly to the case of the spread code for performing spread, reverse spectral spread is performed using the spread code for performing reverse spectral spread which has been phase inverted such that, for example, its polarity is different in every field, and the additional information which has been spectrally spread and superimposed on the video signal is detected.

During reverse spectral spread, the spread code which has been arranged to have different polarity every field is applied to the video signal comprising the spectrally spread anti-duplication control signal, and integrated. The anti-duplication control signal superimposed on the video signal is thereby extracted. In this case, by applying the spread code which has been arranged to have different polarity in every field to the playback signal, the polarity of the video signal components in the playback signal is reversed every field.

The video signal is a signal having a high correlation between adjacent fields, between frames and between adjacent horizontal scanning lines. Therefore by performing integration as part of the process of reverse spectral spread, video signal components of different polarity in adjacent fields cancel each other out, and are thereby eliminated.

In this way, the additional information which has been spectrally spread and superimposed on the video signal may be detected without affecting high level video signal components, and the detection efficiency of additional information is improved. Moreover due to this improved detection efficiency of the additional information superimposed on the video signal, the spread gain may also be reduced.

When the polarity of the spread code is reversed with a timing based on the video sync signal in the video signal as described above, the polarity (phase) of the additional information superimposed on the video signal is reversed according to the applied spread code. In this case, in a similar way to polarity reversal every field of the color sub-carrier wave in the color video signal and polarity reversal between every horizontal scanning period, in the additional information superimposed on the video signal, brightness variations between adjacent additional information of different polarity are reversed, so the variations are averaged and therefore do not stand out. Consequently, visual interference of the reproduced video due to the superimposed additional information is suppressed.

In the video duplication system according to this invention, the superposition level of spectrally spread additional information supplied to the superimposing means of the playback device is adjusted by level adjusting means.

Therefore when the effect of the additional information superimposed on the video signal can be reduced, for example by inverting the polarity of the spread code or the like, the superposition level of the additional information may be increased. By increasing the superposition level, the efficiency of detecting the additional information in the recording device may be further improved.

Regarding the video recording medium according to this invention, in the recording device which receives the video signal played back from this video recording medium, by performing reverse spectral spread using a spread code which starts with the same timing and of which the timing is inverted with the same timing relative to the video signal, as that of the spread code used for spectral spread of the additional information superimposed on the video signal recorded on the medium, the efficiency of detecting the additional information is improved as described hereabove.

Further, the polarity of the spread code is reversed with a timing based on the video sync signal, and this inverted spread code is used for performing spectral spread. Hence as described hereabove, in the additional information superimposed on the video signal, brightness variations between adjacent additional information of different polarity are averaged and do not stand out. Consequently, visual interference of the reproduced video due to the superposition of additional information on the video signal is suppressed.

Therefore, even in the case of a recording medium on which a video signal is recorded wherein spectrally spread additional information is superimposed on the video signal to prevent improper duplication, a good quality video can be obtained.

BRIEF DESCRIPTION OF THE DRAWINGS

FIG. 5 is a diagram for the purpose of describing an example of a PN code generator.

DETAILED DESCRIPTION OF THE PREFERRED EMBODIMENTS

One embodiment of the video duplication control system, video playback device, video recording device, video transmitting method and video recording medium according to this invention will now be described with reference to the appended drawings. In the following description, it will be assumed that the video playback device and video recording device are devices for the recording and playback of a DVD (Digital Video Disc), and are therefore hereafter referred to as DVD devices. To simplify the description, the audio signal system will be omitted.

As will be described in detail hereafter, in the video duplication control system described below, an anti-duplication control signal is superimposed as additional information in the information playback device using a PN (Pseudorandom Noise) sequence code (PN code). This code is reverse spectrally spread in the information recording device so as to extract the anti-duplication control signal which is used to control duplication of the video signal.

Embodiment 1

Figure 1:
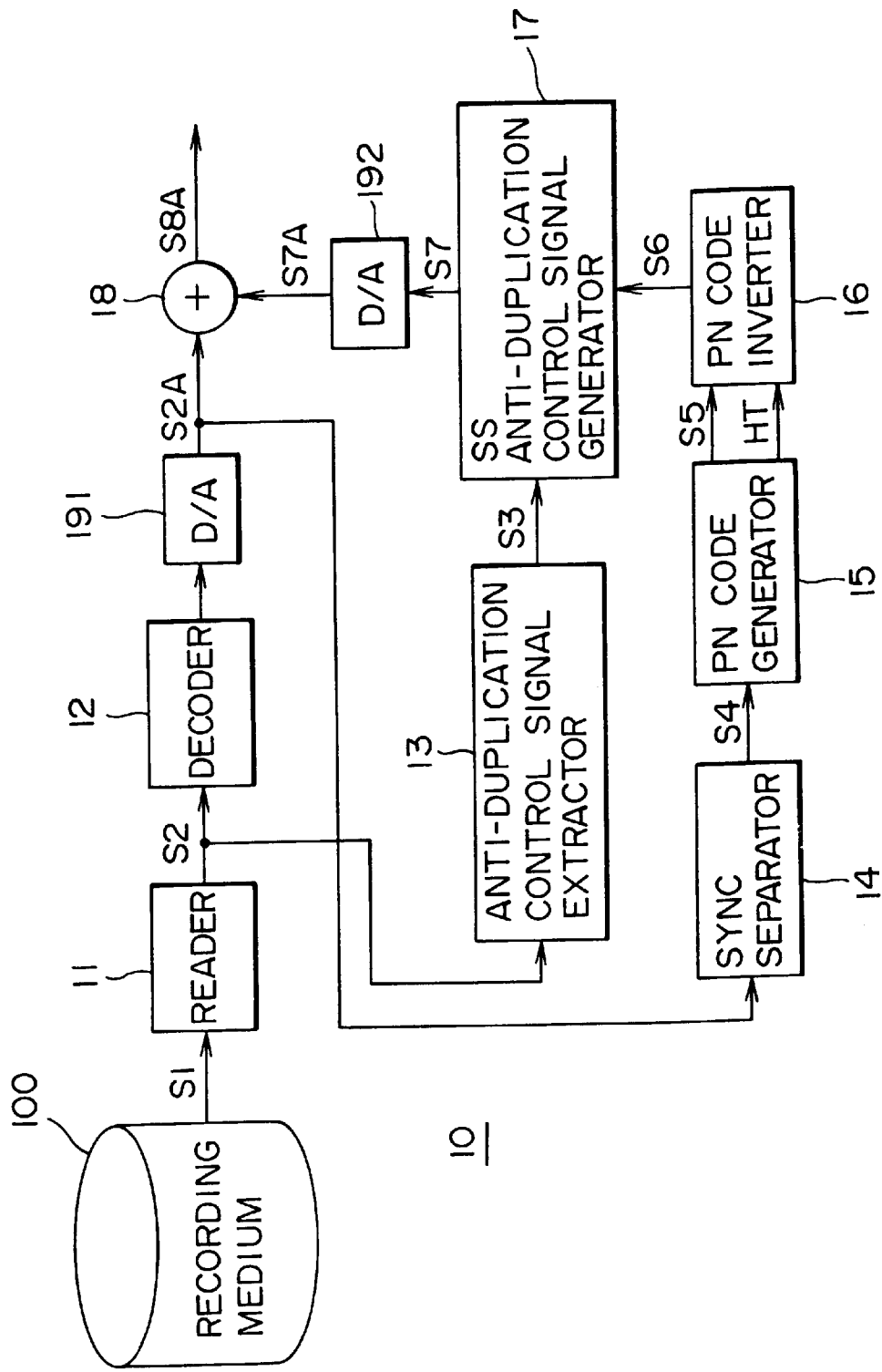
FIG. 1 is a block diagram for the purpose of describing one embodiment of a video playback device of a video duplication control system according to this invention.
Figure 2:
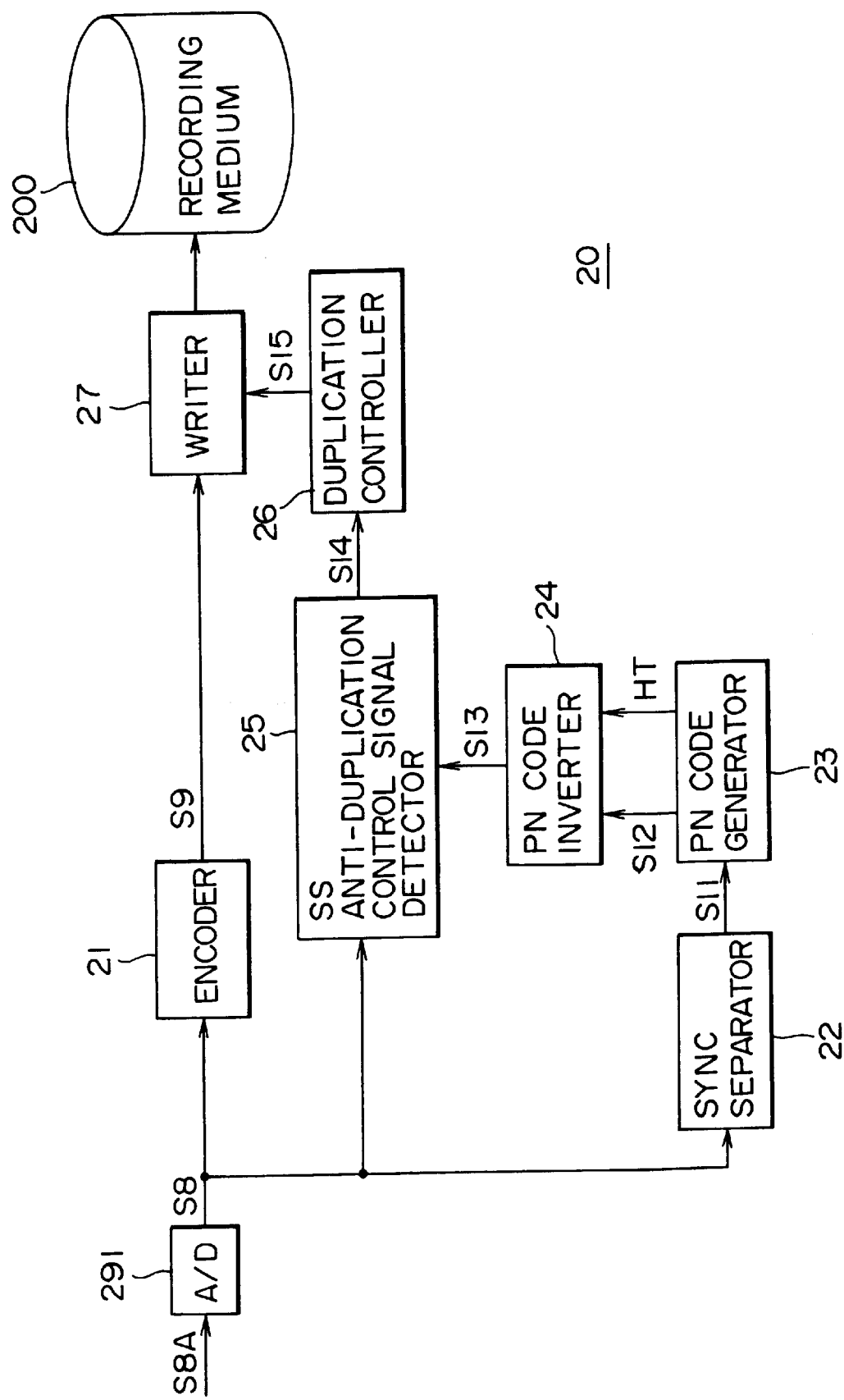
FIG. 2 is a block diagram for the purpose of describing one embodiment of a video recording device of the video duplication control system according to this invention.

FIG. 1 and FIG. 2 are drawings for the purpose of describing a video playback device (referred to hereafter simply as playback device) 10 and a video recording device (referred to hereafter simply as recording device) 20 used in a video duplication control system according to the first embodiment. In other words, the playback device 10 corresponds to the playback system of a DVD device, and the recording device 20 corresponds to the recording system of a DVD device.

In FIG. 1, a recording medium 100 is a medium on which digitized video and audio signals are recorded together with an anti-duplication control signal as additional information. In this case, the medium 100 is a DVD. The anti-duplication control signal may be recorded on the innermost or outermost TOC or a track area known as the directory, or it may be inserted as a separate recording area on a track in which video data or audio data is recorded. In the example described below the latter case is discussed, the anti-duplication control signal being read out at the same time as the video signal is read.

The anti-duplication control signal is a signal for prohibiting or permitting duplication, or limiting the number of duplications, and it is added to the video signal. The recording medium 100 is fitted to the playback device 10, and a recorded signal is read out.

As shown in FIG. 1, the playback device 10 comprises a read-out unit 11, demodulator, 12, anti-duplication control signal extractor 13, sync separator 14, PN code generator 15, PN code inverter 16, spectrally spread anti-duplication control signal generator (referred to hereafter as SS anti-duplication control signal generator) 17, adder 18 and D/A conversion circuits 191, 192.

The read-out unit 11 extracts a playback video signal component S2 from the signal obtained by playing back the recording medium 100, and supplies this to the demodulator 12 and anti-duplication control signal extractor 13.

The demodulator 12 performs demodulation on the playback video signal component S2, generates a digital video signal, and supplies this to the D/A conversion circuit 191. The D/A conversion circuit 191 performs D/A conversion on the digital video signal, generates an analog video signal S2A comprising a sync signal, and supplies the result to the sync separator 14 and adder 18.

The anti-duplication control signal extractor 13 extracts an anti-duplication control signal S3 added to the playback video signal component S2, and supplies the extracted anti-duplication control signal S3 to the SS anti-duplication control signal generator 17.

The sync separator 14 removes a video sync signal S4 from the analog video signal S2A, and supplies the result to the PN code generator 15. According to the first embodiment, a vertical sync signal is extracted as the video sync signal S4, and supplied to the PN code generator 15.

The PN code generator 15 generates a PN code (spread code) using the vertical sync signal S4 as a reference and forms various timing signals to be used in other processors.

Figure 3:
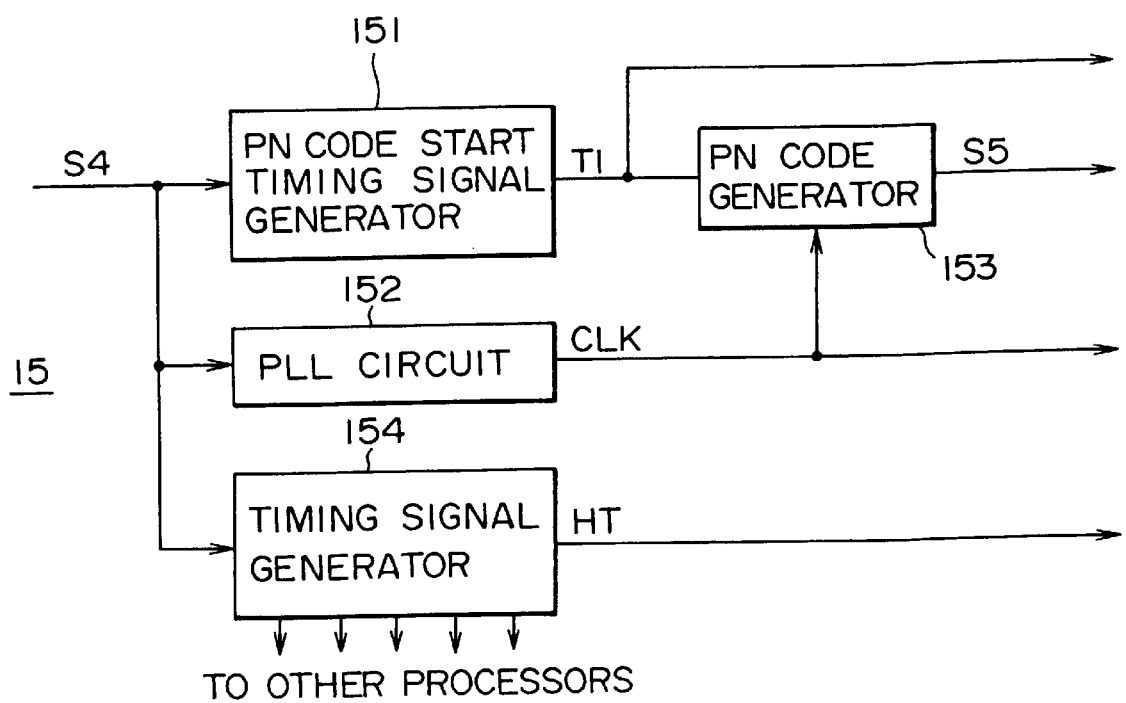
FIG. 3 is a block diagram for the purpose of describing a typical construction of a PN code generator shown in FIG. 1 and FIG. 2.

FIG. 3 is a block diagram for describing the PN code generator 15 of FIG. 1. As shown in FIG. 3, the PN code generator 15 comprises a PN code start timing signal generator 151, PLL circuit 152, PN code generator 153 and timing signal generator 154. The vertical sync signal S4 extracted in the sync separator 14 is supplied to the PN code start timing unit 151 of the PN code generator 15, the PLL circuit 152 and the timing signal generator 154.

The PN code start timing signal generator 151 generates a PN code start timing signal T1 (FIG. 4B) showing the timing at which the PN code starts to be generated, based on the vertical sync signal S4 (FIG. 4A), and this is supplied to the PN code generator 153. The PN code start timing signal T1 starts generation of the PN code every vertical interval (1 V in the figure), based on the vertical sync signal S4.

The PN code start timing signal T1 generated in the PN code start timing unit 151 is used also as a timing signal in other processing units.

The PLL circuit 152 generates a clock signal CLK based on the vertical sync signal S4 supplied to it, and the clock signal is supplied to the PN code generator 153. The PLL circuit 152 generates a clock signal CLK of which the frequency is 250 kHz, as described hereafter.

The PN code generator 153 determines the timing at which the PN code starts to be generated by the PN code start timing signal T1, generates a PN code S5 according to this clock signal CLK, and outputs the result.

FIG. 5 is a drawing showing an example of the PN code generator 153 shown in FIG. 3. The PN code generator 153 in this example comprises twelve flip-flops REG1–REG12 which form a twelve stage register, and exclusive OFF circuits EX-OR1 to EX-OR3 for computing a suitable tap output of this register. When it receives the PN code start timing signal T1 as a reset signal, the clock signal CLK and an enable signal EN, it generates the PN code S5 comprising 4095 chips per vertical interval.

In this case, when the clock rate is of the order of 250 kHz, one period of the PN code is 4095/250=16.38 ms, so a 4095 chip PN code can effectively be contained in one vertical interval (16.7 ms). Also, by using the PN code start timing signal T1 as a reset signal, the clock phase of the PN code in every vertical interval can be specified.

The timing signal generator 154, in addition to various timing signals based on the vertical sync signal S4, generates an inverse timing signal HT (FIG. 4C) used in the PN code inverter 16, described hereafter, and supplies this signal to the PN code inverter 16.

Figure 4:
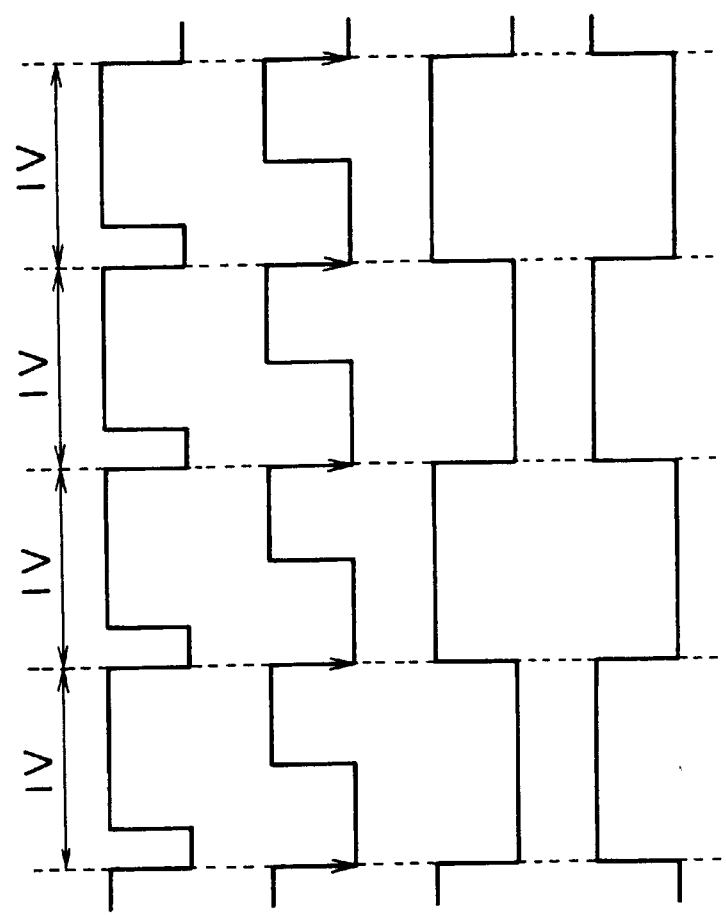
FIGS. 4A–4D are waveform diagrams for the purpose of describing an example of a PN code start timing signal and inversion timing signal generated by the video playback device and video recording device shown in FIG. 1 and FIG. 2.

The inverse timing signal HT is generated as a signal which inverts every vertical interval, as shown in FIG. 4C.

Hence, the PN code generator 15 generates the PN code start timing signal T1 using the vertical sync signal S4 as a reference signal, the clock signal CLK and the inverse timing signal HT, and generates a PN code S5 based on the PN code timing signal T1 and clock signal CLK. The PN code S5, clock signal CLK and inverse timing signal HT are supplied to the PN code inverter 16.

Based on the inverse timing signal HT, the PN code inverter 16 controls whether or not to reverse the polarity (replacing 0 by 1 and 1 by 0) of the PN code S5 in the PN code generator 15 and generates a PN inverse code S6. The inverse timing signal HT inverts every vertical interval as described above, and the PN code inverting unit 16 reverses the polarity of the PN code S5, for example in vertical intervals in which the inverse timing signal HT is high level. A PN inverse code S6 is thereby supplied by the SS anti-duplication control signal generator 17. The inverse timing signal HT may also be a phase as shown in FIG. 4D, i.e. the polarity of the PN code can be reversed in either odd fields or even fields.

The SS anti-duplication control signal generator 17 spectrally spreads the anti-duplication control signal S3 using the PN inverse code S6 so as to generate a spectrally spread anti-duplication control signal S7, and supplies this to the D/A conversion circuit 192. The D/A conversion circuit 192 converts the spectrally spread signal S7 to an analog signal S7A, and supplies this to the adder 18.

The adder 18 adds the analog-converted spectrally spread signal S7A to the analog video signal S2A, and outputs a video signal S8A. The adder 18 therefore functions as superimposing means for superimposing the spectrally spread signal S7A, which is an anti-duplication control signal that has been spectrally spread by the PN inverse code S6, on the analog video signal S2A.

The analog output video signal S8A, formed by superimposing the spectrally spread anti-duplication control signal on the analog video signal, is then supplied to a monitor receiver which displays a video signal or to the recording device 20 records the video signal on a recording medium.

Next, the recording device 20 which receives the video signal S8A from the aforesaid playback device 10 and records it will be described. As shown in FIG. 2, the recording device 20 comprises an encoder 21, sync separator 22, PN code generator 23, PN code inverter 24, detector 25 for detecting the anti-duplication control signal which has been spectrally spread and superimposed on the video signal (referred to hereafter as SS anti-duplication control signal detector), duplication controller 26 which performs control so as to permit or prohibit duplication, writer 27 and A/D conversion circuit 291. The recording medium 200 is a DVD on which the video signal is written by the recording device 20.

The video signal S8A from the playback device 10 is converted to a digital video signal S8 by the A/D conversion circuit 291, and supplied to the encoder 21, sync separator 22 and SS anti-duplication control signal detector 25.

The encoder 21 receives the digital video signal S8, removes the video sync signal, and performs encoding operations such as data compression of the digital video signal. This generates a digital video signal S9 for recording which is supplied to the recording medium 200, and thence to the writer 27.

The sync separator 22 removes the video sync signal S11 from the digital video signal S8 prior to encoding operations, and supplies it to the PN code generator 23. In the recording device 20 also, a vertical sync signal is used as the video sync signal S11 as in the aforementioned playback device 10.

The PN code generator 23 has an identical construction to that of the PN code generator 15 of the playback device 10 which was described referring to FIG. 3, and is equivalent to the PN code start timing signal generator 151, PLL circuit 152, PN code generator 153 shown in FIG. 3 and timing signal generator 154. The following description therefore assumes that the PN code generator 23 has the construction of FIG. 5.

In the PN code generator 23, as in the PN code generator 15 of the aforesaid playback device 10; the PN code start timing signal T1 which starts generation of the PN code every vertical interval, is generated by the PN code start timing signal generator 151, and a clock signal CLK having a frequency of 250 kHz is generated by the PLL circuit 152. The PN code start timing signal T1 and the clock signal CLK are supplied to the PN code generator 153.

Using the PN code start timing signal T1 and the clock signal CLK, the PN code generator 153 generates the PN code S5 (S12 in FIG. 2). Specifically, the PN code S12 is generated with the same start timing and same generation rate relative to the video signal S8 as the PN code S5 generated in the playback device 10.

The timing signal generator 154 of the PN code generator 23 generates the inverse timing signal HT used in the PN code inverter 24. This inverse timing signal HT is a signal which is inverted every vertical interval as described heretofore.

The PN code S12 and inverse timing signal HT generated in the PN code generator 23 are supplied to the PN code inverter 24.

Similarly to the PN code inverter 16 of the playback device 10 described hereabove, the PN code inverter 24 inverts the polarity of the PN code S12 supplied by the PN code generator 23 every other vertical interval according to the inverse timing signal HT so as to generate a PN inverse code S13. The PN inverse code S13 is supplied to the SS anti-duplication control signal detector 25.

The SS anti-duplication control signal detector 25 functions as reverse spectral spread means. By performing reverse spectral spread based on the PN inverse code S13 as a reference signal, it extracts the anti-duplication control signal which has been spread and superimposed on the video signal S8, and supplies it to the duplication controller 26 as an anti-duplication control signal S14.

Specifically, in the SS anti-duplication control signal detector 25, reverse spectral spread is performed using the PN inverse code S13 which is generated with the same start timing, same generation rate and same inversion timing relative to the video signal S8 as the PN inverse code S6 used for spectral spread in the playback device 10.

In this reverse spectral spread, as described heretofore, the anti-duplication control signal superimposed on the video signal S8 is extracted by applying the PN inverse code S13 to the video signal S8 comprising the spectrally spread anti-duplication control signal, and integrating. According to this embodiment, the polarity of the video signal S8 is reversed every vertical interval by applying the PN inverse code S13, of which the polarity is reversed every vertical interval, to the video signal S8.

As described hereabove, the video signal is a signal having a high correlation between adjacent fields. Therefore, by performing integration as part of the process of reverse spectral spread, video signal components of different polarity in adjacent fields cancel each other out, and are thereby eliminated.

By canceling out the high level video signal, the anti-duplication control signal which is spectrally spread and low level, and which is superimposed on the video signal, can be precisely and rapidly extracted. The anti-duplication control signal S14 extracted by the SS anti-duplication control signal detector 25 in this way is supplied to the duplication controller 26.

The duplication controller 26 decodes the anti-duplication control signal S14 and determines whether to prohibit or permit duplication. Based on this determination result, a write control signal S15 is generated and supplied to the write unit 27 so as to permit or prohibit writing of the video signal S9.

When the write control signal S15 permits writing, the write unit 27 writes the video signal S9 on the recording medium 200, and when the write control signal prohibits writing, the write unit 27 does not write the video signal S9 on the recording medium 200.

Hence, by starting generation of the PN code in every vertical interval based on the vertical sync signal, generation of the PN code starts with the same timing relative to the vertical sync signal in the playback device 10 and recording device 20. In other words, based on the video sync signal, synchronism can be established between the PN code used for spectral spread and the PN code used for reverse spectral spread.

Moreover, by using a PN code of reverse polarity to the PN code every vertical interval which has the same timing relative to the video signal in both the playback device 10 and recording device 20, video signal components are canceled out during reverse spectral spread in the recording device 20 as described hereabove, and the anti-duplication control signal which is spectrally spread and superimposed on the video signal can be rapidly and precisely extracted. Consequently, the anti-duplication control signal S14 which is spectrally spread and superimposed on the video signal S8 is detected with higher efficiency, and the spread gain may be reduced.

By using a reverse PN code which has reverse polarity to the PN code every other vertical interval, the polarity of the spectrally spread anti-duplication control signal obtained by applying this PN reverse code is also reversed every vertical interval. The brightness variation of the superimposed anti-duplication control signal is therefore also reversed every field.

The brightness variation of anti-duplication control signals of different polarity superimposed on adjacent fields is therefore averaged out, so that anti-duplication control signal components do not stand out even when the video signal on which the anti-duplication control signal is superimposed, is played back.

According to this first embodiment, the PN code start timing signal T1 initiates the generation of the PN code every vertical interval (one field) based on the vertical sync signal, but it may also initiate the generation of the PN code every two vertical intervals (one frame). Further, the inverse timing signal HT may be generated to reverse the polarity of the PN code every two vertical intervals.

Specifically, a PN code start timing signal T2 of two vertical periods is generated in the PN code start timing signal generator 151 of the PN code generator 15 of the aforesaid playback device 10, and an inverse timing signal HT2 which inverts every two vertical periods is generated in the timing signal generator 154.

In the recording device 20, the PN code start timing signal T2 of two vertical periods is generated in the PN code generator 23 constructed in the same way as the PN code generator 15 of the playback device 10, and the inverse timing signal HT2 of two vertical periods is also generated.

Figure 6:
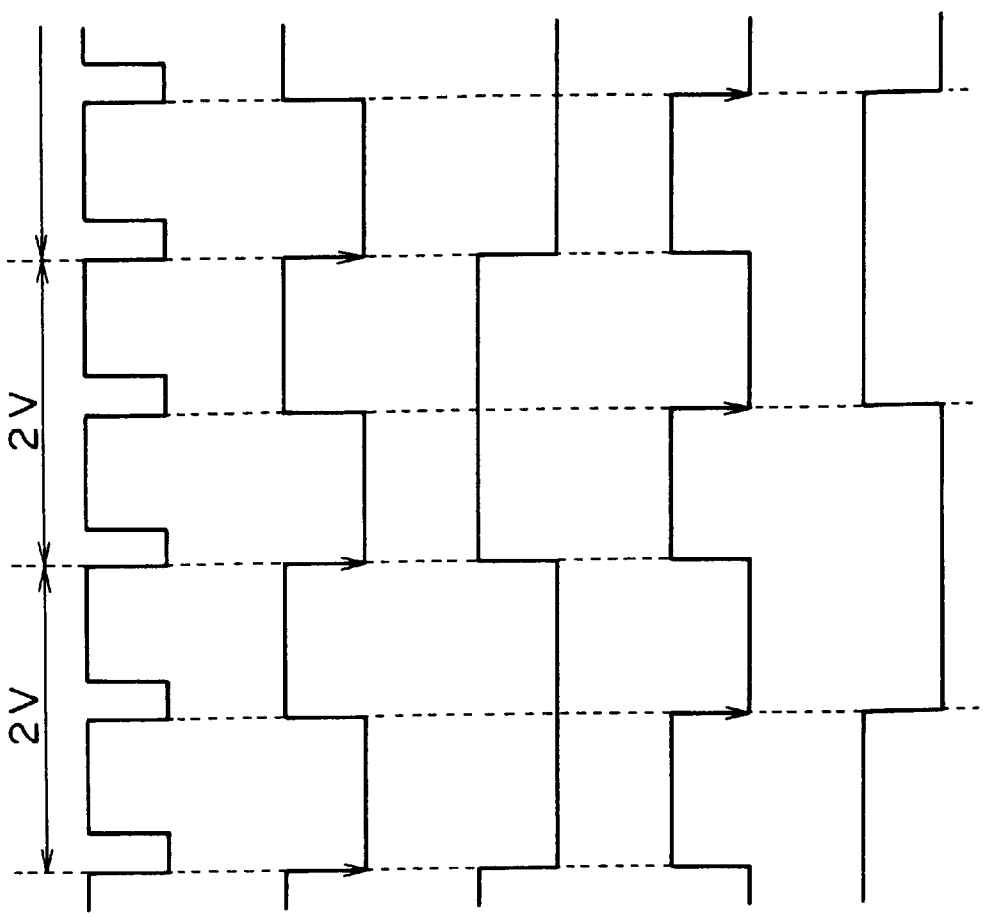
FIGS. 6A–6D are waveform diagrams for the purpose of describing another example of a PN code start timing signal and inversion timing signal generated by the video playback device and video recording device shown in FIG. 1 and FIG. 2.

FIG. 6A–6E show an example of the PN code start timing signal T2 and the inverse timing signal HT2. The PN code start timing signal T2 of two vertical periods which is generated with reference to the front edge of the vertical sync signal (FIG. 6A) may be as shown in FIG. 6B or FIG. 6D. For the PN code start timing signal T2 of FIG. 6B, the inverse timing signal HT2 is as shown in FIG. 6C, and for the PN code start timing signal T2 in FIG. 6D, the inverse timing signal HT2 is as shown in FIG. 6E. Signals having a reverse phase to those of the inverse timing signals HT2 of FIG. 6C or 6E are also respectively generated as inverse timing signals HT2 of two vertical periods, and may be used as such.

By using the PN code start timing signals T2 shown in FIG. 6B, FIG. 6D, and the inverse timing signals HT2, spectral spread of the anti-duplication control signal, superimposing of the spectrally spread anti-duplication control signal on the video signal and reverse spectral spread may be performed in processing units of one frame.

In this case, during reverse spectral spread in the SS anti-duplication control signal detector 25 of the recording device 20, the PN inverse code S13 which starts to be generated every two vertical intervals and of which the polarity is reversed every two vertical intervals, is applied to the video signal S8 comprising the spectrally spread anti-duplication control signal. The polarity of the video signal S8 is therefore also reversed every two vertical intervals.

The video signal is a signal having a high correlation also between adjacent frames as described hereabove, and video signal components of different polarity in adjacent frames cancel each other out during reverse spectral spread even when the PN code start timing signal T2 of one frame period and the inverse timing signal HT2 of one frame period are used. Consequently, the spectrally spread anti-duplication control signal superimposed on the video signal S8 may be precisely and rapidly extracted in the recording device 20 without being affected by video signal components.

By using the PN inverse code of which the polarity is reversed every two vertical intervals, the polarity of the spectrally spread anti-duplication control signal to which this PN code is applied is also reversed every two vertical intervals. Hence, the polarity of the superimposed anti-duplication control signal is reversed at every adjacent frame, and the brightness variation of the superimposed anti-duplication control signal is reversed every two vertical intervals (one frame).

The brightness variation between superimposed anti-duplication control signals of different polarity is therefore averaged over adjacent frames, and it does not stand out even when the video signal on which the anti-duplication control signal is superimposed is played back.

Moreover, the same effect is obtained when the PN code start timing signal of two vertical intervals (one frame) and the inverse timing signal which inverts every two vertical intervals are used, as when the PN code start timing signal of one field period and the inverse timing signal which inverts every vertical interval are used.

When the timing signals T2 and HT2 of FIGS. 6D, E are used, video signal components are canceled out by field correlation, and the brightness variation of the anti-duplication control signal in the playback video does not stand out.

Modification of Embodiment 1

In the aforesaid first embodiment, vertical sync signals are used as the video sync signals S4, S11, but horizontal sync signals may also be used.

In this case, in the playback device 10 shown in FIG. 1, a horizontal sync signal is extracted from the video signal, and this is supplied to the PN code generator 15 as the video sync signal S4.

As described hereabove, the PN code generator 15 is constructed as shown in FIG. 3. In the PN code start timing signal generator 151 of the PN code generator 15, a PN code start timing signal T3, which starts generation of the PN code every horizontal interval (referred to hereafter as 1 H), is generated based on a horizontal sync signal S4.

Figure 7:
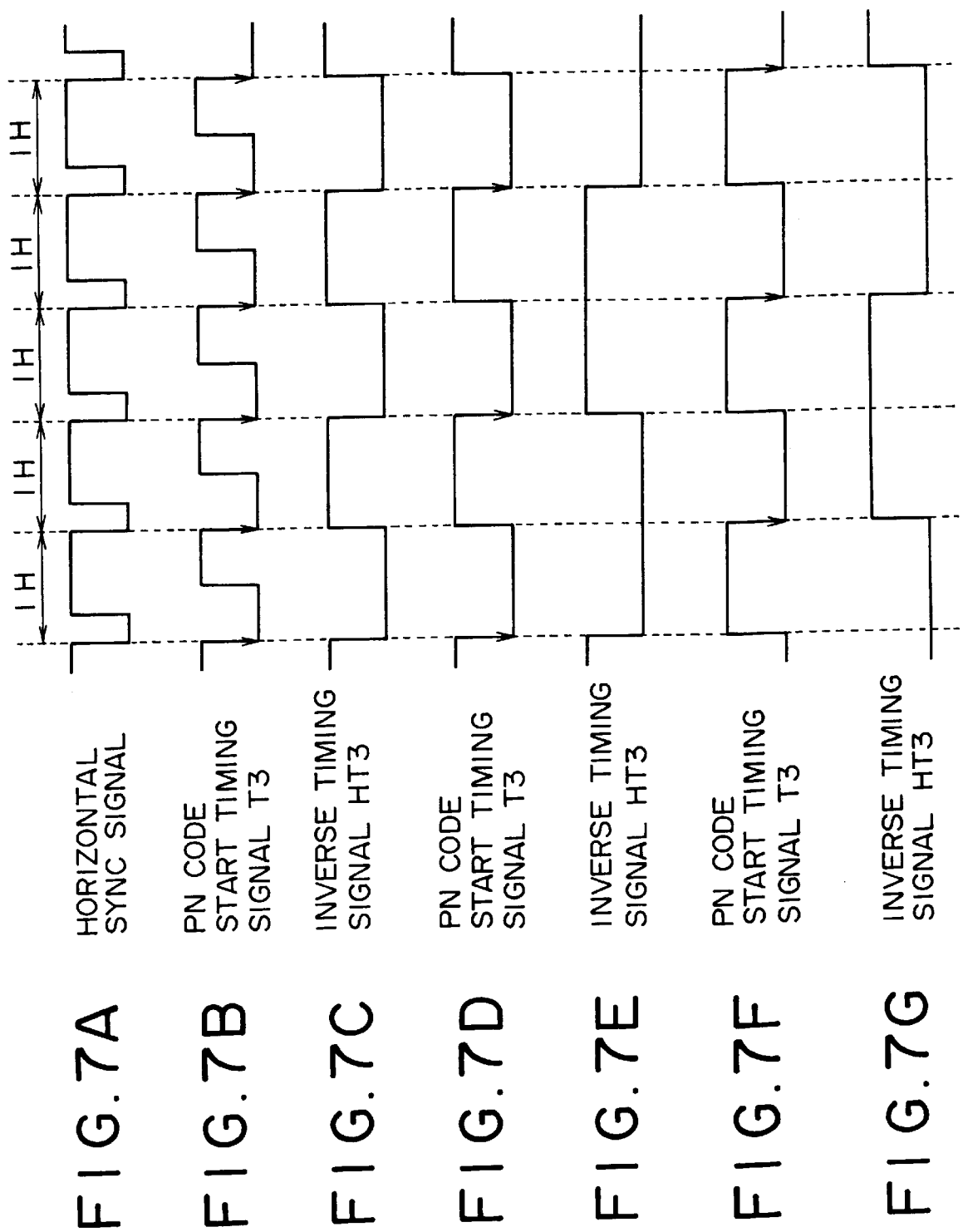
FIG. 7 is a diagram for the purpose of describing another example of a PN code start timing signal and inversion timing signal generated by the video playback device and video recording device shown in FIG. 1 and FIG. 2.

FIG. 7A–7G describe examples of the PN code start timing signal T3 generated in the PN code start timing signal generator 151 and an inverse timing signal HT3. FIG. 7B is an example of the PN code start timing signal T3 which starts generation of the PN code every 1 H based on the front edge of the horizontal sync signal (FIG. 7A). FIG. 7C is an example of the inverse timing signal HT3 in this case, which is a signal that inverts every 1 H. In this case, the inverse timing signal HT3 may be a signal of reverse phase to the signal shown in FIG. 7F.

In the case of this example, the clock signal CLK is generated based on the horizontal sync signal S4 as a reference signal in the PLL circuit 152. This clock signal CLK is supplied to the PN code generator 153. In this example, the PLL circuit 152 generates a clock signal CLK of which the frequency is, for example, 1 MHz.

Figure 8:
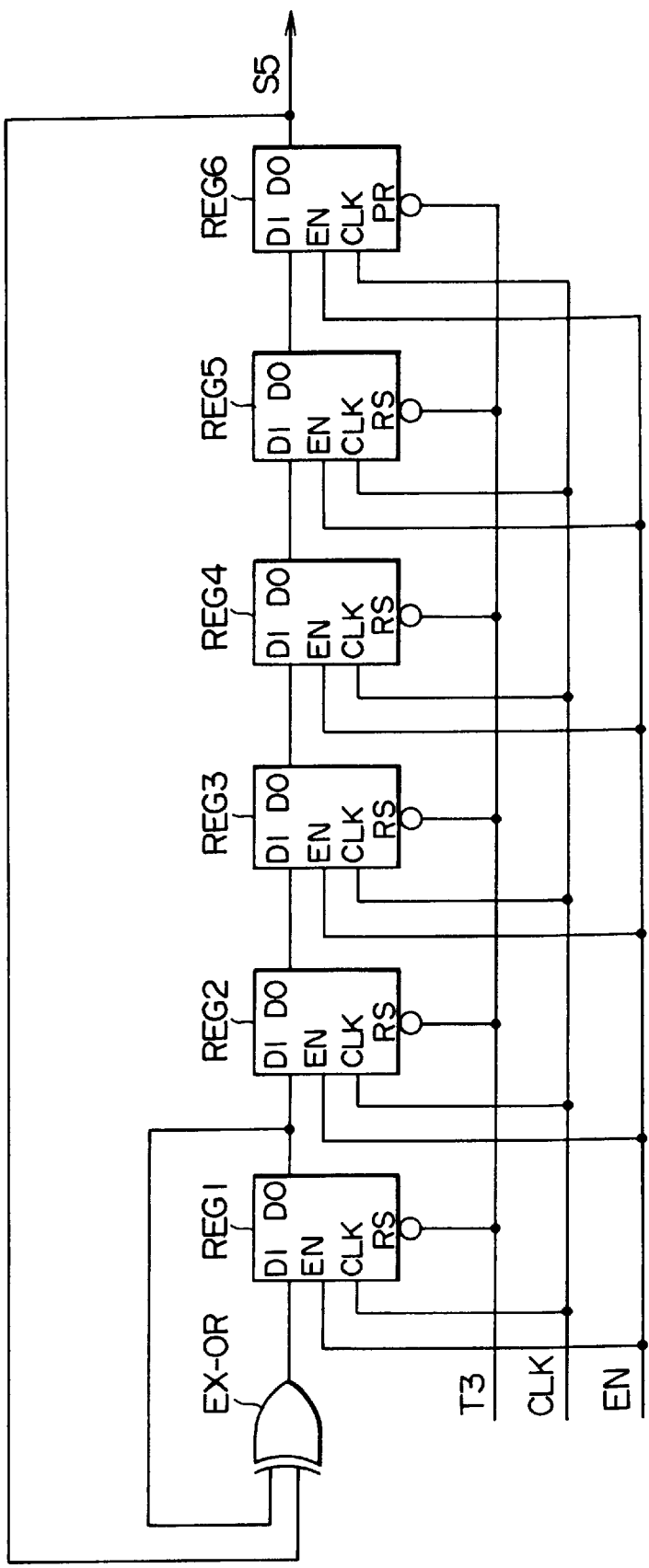
FIG. 8 is a diagram for the purpose of describing an example of a PN code generator.

FIG. 8 is a drawing showing an example of the PN code generator 153 used in this case, comprising six D flip-flops REG1 to REG6 and exclusive OFF circuits EX-OR. The PN code generator shown in FIG. 8 receives the PN code start timing signal T3 as a reset signal, the clock signal CLK and an enable signal EN, and generates a PN code of sixty-three chips per 1 H.

In this case when the clock rate is 1 MHz, one period of the PN code is 63/1=63 µs, so a sixty-three chip PN code is generated in effectively one horizontal scanning interval (63.5 µs). Also by using for example the PN code start timing signal T3 as a reset signal, the phase of the PN code every 1 H can be specified.

In the timing signal generator 154, the inverse timing signal HT and various other timing signals are generated using the horizontal sync signal as a reference signal. In this example the timing signal generator 154 generates the inverse timing signal HT3 which reverses the polarity of the PN code every 1 H in the same way as the PN code start timing signal T3.

Therefore, in the playback device 10, the anti-duplication control signal S3 is spectrally spread using the PN inverse code S6 which starts to be generated every 1 H and of which the polarity is reversed every 1 H as a reference signal, and the PN inverse code S6 is superimposed on the video signal.

Likewise, in the recording device 20 shown in FIG. 2, the horizontal sync signal is extracted from the video signal by the sync separator 22, and is supplied to the PN code generator 22 using the extracted horizontal sync signal as the video sync signal S11.

The PN code generator 22 of this recording device 20 is constructed in the same way as the PN code generator 15 of the playback device 10. It generates the PN code start timing signal T3 which starts generation of the PN code S12 every 1 H, a clock signal CLK of frequency 1 MHz, and the inverse timing signal HT3 which reverses the phase of the PN code S12 every 1 H in the same way as the PN code generation timing signal T3.

Therefore in the recording device 20, reverse spectral spread is performed using the PN inverse code S13 which starts to be generated every 1 H and of which the polarity is reversed every 1 H, and a spectrally spread anti-duplication control signal which is superimposed on the video signal is extracted.

When the PN code S5 starts to be generated every 1 H and the polarity of the PN code S5 is reversed every 1 H in the playback device 10, the PN code S12 starts to be generated every 1 H and the polarity of the PN code S12 is reversed every 1 H in the recording device 20. The start timing (clock phase) of the PN inverse codes S6, S13 generated in the playback device 10 and recording device 20 is therefore applied to the video signal every 1 H.

During reverse spectral spread in the recording device 20, reverse spectral spread is performed by applying the PN inverse code S13 to the video signal S8 from the playback device 10. During this reverse spectral spread, as described heretofore, by applying the PN inverse code S13 to the video signal S8 comprising the spectrally spread anti-duplication control signal and integrating, the anti-duplication control signal superimposed on the video signal can be extracted.

By applying this PN inverse code signal S13 to the video signal S8, the polarity of the video signal S8 is also reversed every 1 H. The video signal is a signal having a high correlation also between adjacent horizontal intervals. During the integration process in reverse spectral spread, video signal components in adjacent horizontal intervals in which the polarity is reversed, cancel each other out and are eliminated. The anti-duplication control signal superimposed on the video signal may therefore be extracted without being affected by video signal components.

As video signal components can be canceled out during reverse spectral spread even when the PN code start timing signal T1 and the inverse timing signal HT are generated based on the horizontal sync signal, the anti-duplication control signal which is spectrally spread and superimposed on the video signal can be precisely and rapidly extracted without being affected by video signal components.

As described hereabove, the polarity of the PN inverse code S13 is inverted every 1 H. By applying this inverse code, the phase of the anti-duplication control signal is also reversed every 1 H, and consequently brightness variations of the anti-duplication control signal superimposed on the video signal are averaged out over adjacent horizontal intervals. The superimposed anti-duplication control signal therefore does not stand out and there is no video deterioration even when the video signal on which the anti-duplication control signal is superimposed is played back.

According to this embodiment, the PN code start timing signal T3 was generated as a signal having a period of 1 H, but it may also have a period of two horizontal intervals (referred to hereafter as 2 H).

FIG. 7D and FIG. 7E both show an example of the PN code start timing signal T3 which starts PN code generation every 2 H. In this case, the signals having reverse phase shown in FIG. 7E and FIG. 7G may also respectively be used as the corresponding inverse timing signal HT3.

Hence, even when the horizontal sync signal is used as a reference, the efficiency of detecting the spectrally spread anti-duplication control signal superimposed on the video signal can be improved, and as visual interference due to superposition of the anti-duplication control signal on the video signal when the video signal is played back does not stand out, the spread gain can be reduced. As a result, the same effect is obtained when the horizontal sync signal is used as a reference signal as when the vertical sync signal is used as a reference signal.

Embodiment 2

Next, a video duplication control system and video playback device according to a second embodiment of this invention will be described.

Figure 9:
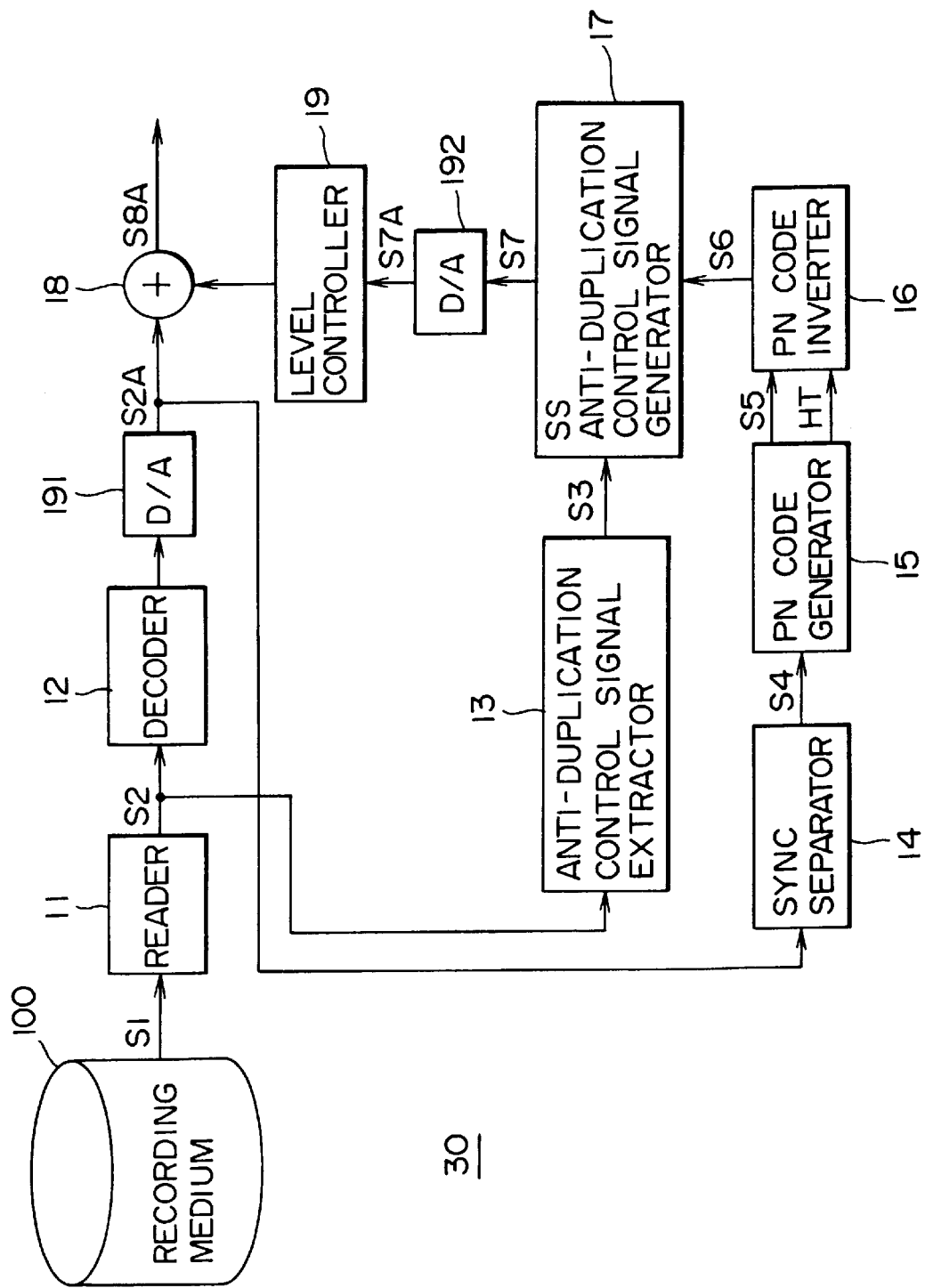
FIG. 9 is a block diagram for the purpose of describing another embodiment of the video playback device of the video duplication control system according to this invention.

FIG. 9 is a block diagram for the purpose of describing a playback device used in a video duplication control system according to the second embodiment. As the recording device in the video duplication control system according to the second embodiment, the recording device 20 according to the aforesaid first embodiment is used.

As shown in FIG. 9, the playback device 30 according to the second embodiment comprises the read-out unit 11, decoder 12, anti-duplication control signal extractor 13, sync separator 14, PN code generator 15, PN code inverter 16, SS anti-duplication control signal generator 17, adder 18 and D/A conversion circuits 191, 192, as in the case of the playback device 10 according to the aforesaid first embodiment. In the playback device 30 according to the second embodiment, a level controller 19 is provided between the SS anti-duplication control signal generator 17 and adder 18.

Apart from the level controller 19, the playback device 30 operates in the same way as the aforesaid playback device 10. Therefore, in the playback device 30 according to the second embodiment, when the vertical sync signal is used as the video sync signal S4, the PN code S5 is generated every vertical interval and the PN inverse code S6 in which the polarity of the PN code S5 is reversed is generated every vertical interval, as in the case of the aforesaid playback device 10. This is used to perform spectral spread of the anti-duplication control signal S3 extracted by the anti-duplication control signal extractor.

This spectrally spread signal S7 is D/A converted, and the polarity of the video signal component is reversed every vertical interval during reverse spectral spread in the recording device 20 by supplying the video signal S8A, produced by superposition on the analog video signal S2A, to the recording device 20. Image signal components are canceled out due to interfield correlation in the video signal.

Therefore in the recording device 20, as described hereabove, the efficiency of detecting the anti-duplication control signal superimposed on the video signal is improved, and the spread gain may be reduced. Also, the anti-duplication control signal superimposed on the video signal does not cause deterioration of the video signal.

When the anti-duplication control signal superimposed on the video signal causes little deterioration of the video signal, the superposition level of the spectrally spread anti-duplication control signal may be increased within such limits that the video signal is not deteriorated.

The playback device 30 of the second embodiment therefore comprises the level adjuster 19 as shown in FIG. 9 so that the superposition level of the spectrally spread signal S7A superimposed on the analog video signal S2A may be increased.

In the level adjuster 19 of the playback device 30, when a spectrally spread signal S7A of high level is superimposed on the analog video signal S2A, the efficiency of detecting the anti-duplication control signal in the recording device 20 is further improved.

According also to this second embodiment, generation of the PN code may be started every 2 V, and the polarity of the PN code may be reversed every 2 V.

According to this second embodiment, a vertical sync signal was used as the video sync signal S4, however it will be understood that a horizontal sync signal may also be used instead.

According to the aforesaid first and second embodiments, the anti-duplication control signal added to the video signal on the recording medium 100 is extracted, this is spectrally spread using the PN inverse code S6, and the result is superimposed on the video signal supplied to the recording device, however a recording medium on which a spectrally spread anti-duplication control signal has been previously superimposed may also be used.

In the case of a recording medium on which a spectrally spread anti-duplication control signal has been previously superimposed, there is no need to extract the anti-duplication control signal, perform spectral spread and superimpose the spectrally spread anti-duplication control signal on the video signal as in the aforesaid playback devices 10, 30, it being sufficient to play back the recording medium to output the video signal.

In this case, in the recording device 20, reverse spectral spread is performed using a PN inverse code which starts to be generated at the same rate with the same timing, and of which the polarity is reversed with the same timing, as the PN inverse code used for spectral spread of the anti-duplication control signal which was previously superimposed on the video signal recorded on the recording medium.

Hence, even when a recording medium is used on which a spectrally spread anti-duplication control signal has been previously superimposed, the anti-duplication control which is spectrally spread and superimposed on the video signal can be extracted, and duplication controlled according to the anti-duplication control signal.

An anti-duplication control signal generator may also be provided in the playback device, and an anti-duplication control signal generated in the playback device spectrally spread using the PN inverse code and superimposed on the output video signal, as described hereabove.

In this case, when an anti-duplication control signal is not recorded on the recording medium or when the spectrally spread anti-duplication control signal is not superimposed, duplication control in the recording device may be performed using an anti-duplication control signal which has been generated in the playback device and superimposed on the output video signal.

According to the aforesaid first and second embodiments, the PN code generation start timing and PN code polarity inversion timing were described as every vertical interval or every two vertical intervals, but the invention is not limited to this arrangement. Various timings may be used based on the vertical sync signal, for example every fractional part of a vertical interval such as every ½ or every ¼ of a vertical interval, or every integral multiple of a vertical interval such as every three or four vertical intervals.

Likewise, when a horizontal sync signal is used as the video sync signal, the PN code generation start timing and PN code polarity reversal timing may be an integral multiple of a horizontal interval such as every 1 H, every 2 H or every 3 H, or a fractional part of a horizontal interval such as ½ H or ⅓ H.

Further, the spectrally spread anti-duplication control signal superimposed timing may also be inserted intermittently such as every other vertical interval or every two vertical intervals. Moreover, a plurality of information such as information to permit or prohibit duplication, or information for controlling the number of duplications, may be inserted alternately every 1 V or every 2 V. It will be understood that when a horizontal sync signal is used, information may likewise be inserted intermittently every other 1 H or 2 H, or a plurality of information inserted alternately every 1 H or 2 H.

The positional relationships between the video sync signal, the PN code generation start timing and the timing with which polarity is reversed may be freely altered as desired. For example, according to the aforesaid first embodiment, the PN code start timing signal T1 and inverse timing signal HT were generated based on the front edge of the vertical sync signal, however the PN code start timing signal T1 and inverse timing signal HT may be generated based on a position removed by a predetermined number of blocks from the front edge of the video sync signal.

Also, the positional relationship between the PN code start timing signal and PN code inversion timing signal may be unique, or their phases may be reversed, or alternatively they may be made independent so that the PN code start timing T1 has a period of 1 V and the inverse timing signal HT has a period of 2 V.

It is also possible to construct a video signal recording/playback device incorporating the functions of both the playback device 10 and recording device 20. In this case, the sync separators 14, 22 and PN code generators 15, 24 may be constructed so that they are shared by the playback system 30 and recording system 20. Alternatively, a video signal recording/playback device may be constructed having the functions of both the playback device 30 and recording device 20.

The aforesaid first and second embodiments were described for the case of analog connections, wherein analog video signals were supplied from the playback devices 10, 30 to the recording device 20, however this invention may be applied also to the case of digital connections.

Further, in the aforesaid first and second embodiments, the playback and recording devices were described in the context of their application to a DVD device, however the invention is not limited to this case. It may for example be applied to a VTR, digital VTR, video disc, or video CD playback device and recording device. The invention may also be applied both to analog instruments such as an analog VTR or digital instruments such as a DVD device.

In the aforesaid first and second embodiments, the following procedure may be followed instead of using the PN inverse code of which the polarity is reversed with a timing based on the video sync signal.

For example, the spectrally spread anti-duplication control signal may be superimposed every other field of the video signal. In this case during reverse spectral spread in the recording device, after applying a PN code, having the same generation timing and generation rate as the PN code used for spectral spread in the playback device, to the video signal on which the spectrally spread anti-duplication control signal is superimposed, the video signal in a field on which the anti-duplication control signal is not superimposed is subtracted from the video signal in an adjacent field on which the anti-duplication control signal is superimposed.

Image signal components in adjacent fields (vertical intervals) having a high correlation are thereby canceled out, and the anti-duplication control signal superimposed on the video signal may be efficiently extracted. It will be understood that this subtraction may also be performed between adjacent frames or between adjacent horizontal intervals (horizontal lines).

As described hereabove, in the video duplication control system, video playback device and video recording device according to this invention, a spread code is generated with a timing based on a video sync signal, so spread codes can start to be generated with the same timing relative to the video signal in the playback device and recording device. Reverse spectral spread may thus be performed rapidly in the recording device.

Also, as the polarity of the spread code is reversed with a timing based on the video sync signal, the polarity of the video signal is reversed according to the polarity reversal of the spread code during the process of reverse spectral spread. As a result, video components in adjacent horizontal scanning lines, fields or frames having reversed polarity are canceled out during reverse spectral spread, so additional information superimposed on the video signal may be efficiently detected.

Hence, the efficiency of detecting spectrally spread additional information superimposed on the video signal is improved, and as the efficiency of detecting additional information is improved, the spread gain may be reduced.

Further, by using a spread code of which the polarity is reversed with a timing based on the video sync signal, the polarity of the spectrally spread additional information to which this spread code is applied is also reversed with a timing based on the video sync signal. As a result, as the polarity of the anti-duplication control signal superimposed on adjacent horizontal intervals or vertical intervals is different, the brightness variation of the additional information is averaged, and the video signal does not deteriorate even when the additional information is superimposed on it.

As the additional information superimposed on the video signal causes little deterioration of the video signal, the superposition level of the spectrally spread additional information may be increased. Consequently, when the superposition level is increased, the efficiency of detecting additional information in the recording device may be further improved.

What is claimed is:

1. A signal playback method comprising:
   a sync signal separating step for separating a sync signal from a signal;
   a spread code generating step for generating a spread code with a start timing based on said sync signal;

a spread code inverting step for reversing a phase of said spread code generated by said spread code generating step with a timing based on said sync signal and producing a processed spread code; and a superimposing step for superimposing said processed spread code on said signal.

2. The signal playback method as claimed in claim 1, further comprising a spectrum spreading step for spectrally spreading duplication control information according to said processed spread code.

3. The signal playback method as claimed in claim 1, wherein said sync signal separated from said signal is a vertical sync signal.

4. The signal playback method as claimed in claim 1, wherein said sync signal separated from said signal is a horizontal sync signal.

5. An information extracting method for extracting additional information from a signal on which said additional information, which has been spectrally spread according to a spread code generated with a start timing based on a sync signal in said signal has been superimposed, comprising:

a sync signal separating step for separating said sync signal from said signal;

a spread code generating step for generating said spread code with said start timing based on said sync signal;

a spread code inverting step for reversing a phase of said spread code generated by said spread code generating step with a timing based on said sync signal and producing a processed spread code; and a reverse spectral spread step for performing reverse spectral spread according to said processed spread code and extracting said additional information superimposed on said signal.

6. The information extracting method as claimed in claim 5, wherein said sync signal separated from said signal is a vertical sync signal.

7. The signal playback method as claimed in claim 5, wherein said sync signal separated from said signal is a horizontal sync signal.

* * * * *